United States Patent Office.

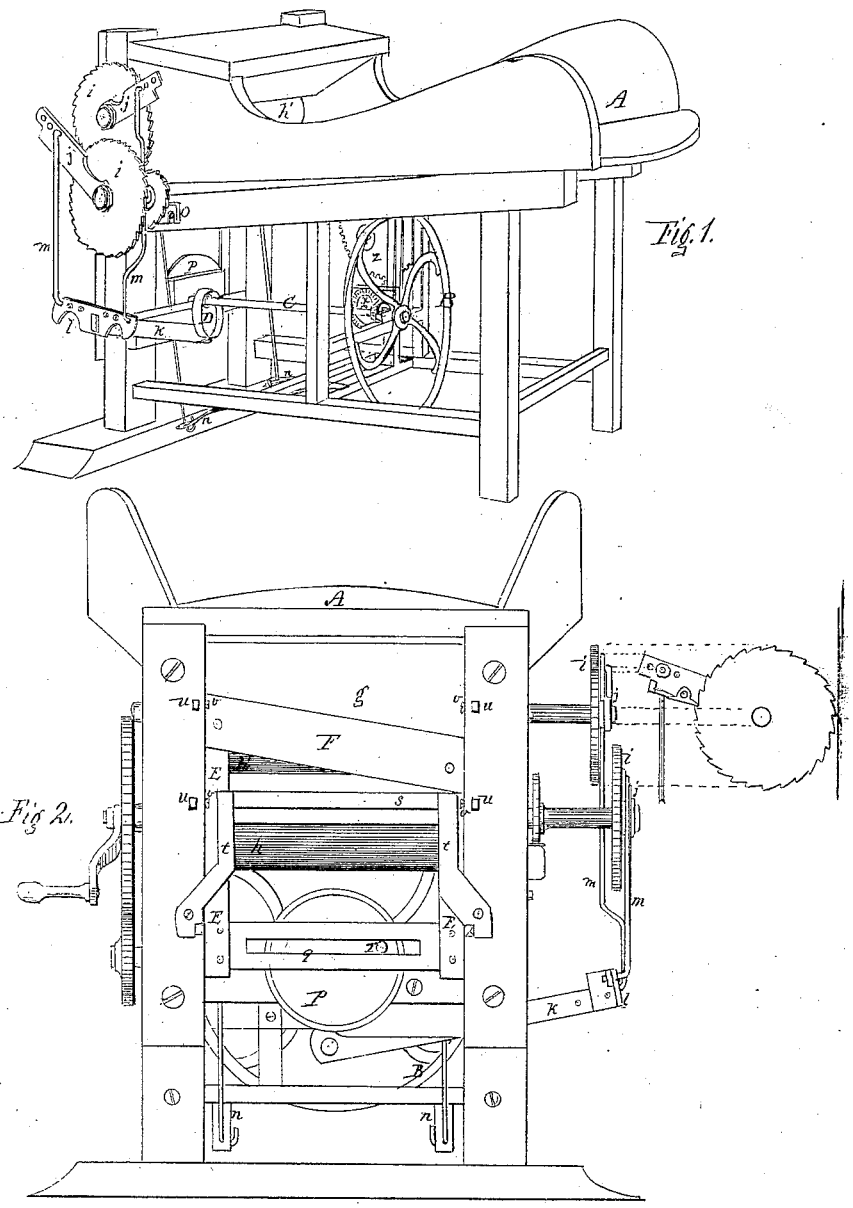

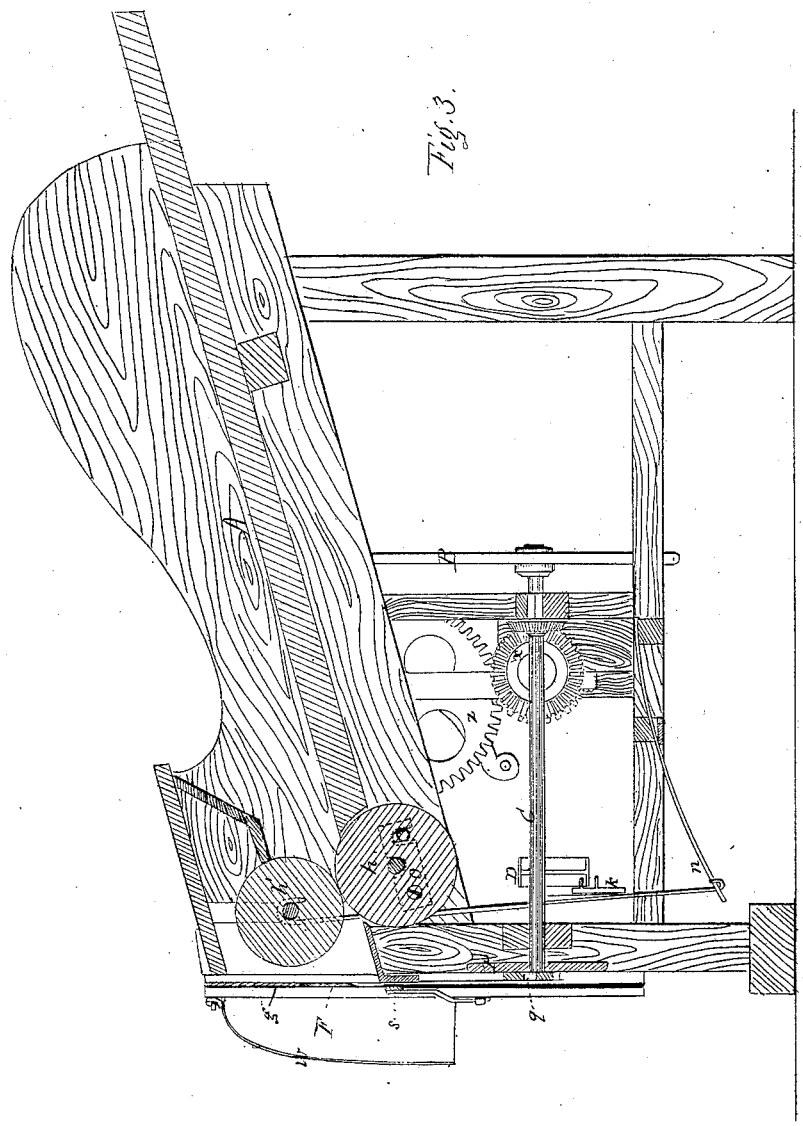

W. D. SCHOOLEY, OF RICHMOND, INDIANA.

*Letters Patent No. 65,125, dated May 28, 1867.*

STRAW-CUTTER.

*The Schedule referred to in these Letters Patent and making part of the same.*

TO WHOM IT MAY CONCERN:

Be it known that I, W. D. SCHOOLEY, of Richmond, Wayne county, State of Indiana, have invented certain new and useful Improvements in Feed-Cutting Machines; and I do hereby declare the following to be a full and exact description of the same, reference being had to the drawings that accompany and form a part of these specifications, in which—

Figure I is a perspective view.
Figure II, a front elevation.
Figure III, a longitudinal section.

Letter A, box to hold the hay or other articles to be cut. Letter B, balance-wheel. Letter C, main shaft. Letter D, cam on said shaft. Letter E, knife-sash or frame. Letter F, knife. Letter g, guard to prevent the uncut feed from getting above the knife. Letters $h$ $h'$, two feeding-rollers. Letters $i$ $i$, ratchet-wheels on the shaft of the rollers $h$ $h'$. Letters $j$ $j$, levers loose on the shaft of the rollers $h$ $h'$. Letter $k$, lever with cross-head $l$ operated by the cam D, and this lever in turn operates the levers $j$ $j$ through the connecting-rods $m$ $m$. The levers $j$ $j$ have pawls on them, which work the ratchets $i$ $i$, and thus rotate the feed-rollers $h$ $h'$. Letters $n$ $n'$, springs which allow for more or less vertical motion to the roller $h'$. Letter O, adjustable bearing for roller $h$. Letter P, wheel on the main shaft. Letter $q$, slot in the cross-bar to the knife-frame. Letter $r$, pin which, being eccentric in the wheel P, carries the knife up and down. Letter $s$, thin bar, being just in front of shears-jaw, kept in place by the springs $t$ $t$, and serves as a support while the knife is descending. Letters $u$ $u$, wooden keys, the inner ends of which bear against the frame E. These keys are adjustable by means of the set-screws $v$ $v$. Letter $w$, guard to keep the cut feed from being thrown about, as also to remove the liability of accidental cutting of the hands of the operator or others. This guard is made detachable, being hung upon hooks for that purpose, as shown in fig. 3, and may or may not be used. Letter $x$, bevel-gear connected with the short shaft that reaches from the main shaft C to the driving-wheel or pulley. Letter $z$, crank-wheel connected with the driving-pulley. The material used in the manufacture is such as is ordinarily employed in machines of this kind.

The drawings will exhibit the arrangement of parts.

The features of my invention are the placing the main shaft C beneath the box out of the way; the use of the lever $k$, the rods $m$ $m$, the ratchets $i$ $i$, and levers $j$ $j$, as means of moving the feed-rollers; the adjustable keys $u$ $u$, the sustaining bar $s$, and hinged guard $w$. This latter is detachable, and can be removed when desired.

What I claim as my invention, and desire to secure by Letters Patent, is—

1. The arrangement of the balance-wheel B and main shaft C, relative to the main frame and knife-sash E, substantially as described and for the purposes set forth.
2. The use of the lever $k$, when provided with the adjustable head $l$, and operated by the cam D, and to operate in combination with the rods $m$ $m$ and levers $j$ $j$, for the purposes specified.
3. The adjustable bearings O, as described and set forth.
4. The keys $u$ $u$, for adjusting the knife-frame, as shown and described.
5. The guard $w$, when made detachable, substantially as described and set forth.

W. D. SCHOOLEY.

Witnesses:
S. D. JONES,
JOHN T. BLISS.